US011055589B2

(12) United States Patent
Pic et al.

(10) Patent No.: US 11,055,589 B2
(45) Date of Patent: Jul. 6, 2021

(54) METHOD FOR AUTHENTICATING AN ILLUSTRATION (71) Applicant: SURYS, Marne la Vallee (FR)

(72) Inventors: Marc Pic, Boulogne Billancourt (FR); Mohammed Amine Ouddan, Le Perreux sur Marne (FR)

(73) Assignee: SURYS, Bussy-Saint-Georges (FR)

( * ) Notice: Subject to any disclaimer, the term of this patent is extended or adjusted under 35 U.S.C. 154(b) by 29 days.

(21) Appl. No.: 16/347,877

(22) PCT Filed: Nov. 7, 2017

(86) PCT No.: PCT/FR2017/053039
§ 371 (c)(1),
(2) Date: May 7, 2019

(87) PCT Pub. No.: WO2018/087465
PCT Pub. Date: May 17, 2018

(65) Prior Publication Data
US 2019/0354822 A1 Nov. 21, 2019

(30) Foreign Application Priority Data
Nov. 9, 2016 (FR) ...................................... 1660874

(51) Int. Cl.
*G06K 19/00* (2006.01)
*G06K 19/06* (2006.01)
(Continued)

(52) U.S. Cl.
CPC . *G06K 19/06037* (2013.01); *G06K 19/06103* (2013.01); *G07D 7/0043* (2017.05); *G07D 7/202* (2017.05); *G07D 7/2016* (2013.01)

(58) Field of Classification Search
CPC ....... G06K 19/06037; G06K 19/06103; G07D 7/202; G07D 7/0043; G07D 7/2016
See application file for complete search history.

(56) References Cited

U.S. PATENT DOCUMENTS

2014/0144996 A1* 5/2014 Friedman ......... G06K 19/06037
235/494
2015/0347889 A1* 12/2015 Nosaka ................ G06K 7/1439
726/7
(Continued)

FOREIGN PATENT DOCUMENTS

DE 2759270 7/1979
EP 2581860 4/2013
(Continued)

*Primary Examiner* — Pakee Fang
(74) *Attorney, Agent, or Firm* — Occhiuti & Rohlicek LLP (57) ABSTRACT

The invention relates to a method for authenticating an illustration, comprising—encoding a message in the form of a two-dimensional barcode comprising blocks, each block coding a fragment of said message and comprising a set of coding sub-blocks, each sub-block comprising a set of binary elements. It is essentially characterised in that the encoding comprises prior steps consisting in:—defining or identifying a set of noteworthy points in the illustration,—calculating a set of attributes depending on certain at least of the noteworthy points,—selecting, among the calculated attributes, at least one attribute allowing a digital fingerprint to be defined—optionally compressing said digital fingerprint,—optionally signing said digital fingerprint by means of a cryptographic signature, and—recording in the message one among:—a set of at least one attribute,—the digital fingerprint,—the compressed digital fingerprint, and—the signed and optionally compressed digital fingerprint.

14 Claims, 1 Drawing Sheet

(51) Int. Cl.
*G07D 7/202* (2016.01)
*G07D 7/0043* (2016.01)
*G07D 7/20* (2016.01)

(56) References Cited

U.S. PATENT DOCUMENTS

| | | | | |
|---|---|---|---|---|
| 2016/0088181 A1* | 3/2016 | Chen | ................... | G07D 7/0053 358/2.1 |
| 2016/0342874 A1* | 11/2016 | Powell | ................. | G06K 7/0004 |
| 2018/0082096 A1* | 3/2018 | Lei | ..................... | G06K 7/10851 |
| 2021/0012451 A1* | 1/2021 | Calhoon | ................ | G06T 1/0028 |

FOREIGN PATENT DOCUMENTS

| | | | | |
|---|---|---|---|---|
| EP | 2743893 | | 6/2014 | |
| EP | 2937819 | | 10/2015 | |
| WO | WO-2014090804 A1 * | | 6/2014 | ........... G07D 7/0047 |

\* cited by examiner

METHOD FOR AUTHENTICATING AN ILLUSTRATION

CROSS REFERENCE TO RELATED APPLICATIONS

This application is a National Stage of International Application No. PCT/FR2017/053039 filed on Nov. 7, 2017, which claims the benefit of the priority date of French Application No. 1660874, filed on Nov. 9, 2016, the contents of which are hereby incorporated by reference in their entirety.

FIELD OF THE INVENTION

The present invention relates to the field of authenticating an illustration.

Illustration is understood to mean any non-uniform graphical representation; e.g. a painting, a drawing, a photograph, etc.

For the sake of brevity, only the case where the illustration is a photograph, particularly a portrait, will be described here.

In this context, the present invention finds a particular application in the field of verifying identity documents, including a photograph of the identity document holder, typically official identity documents (identity card, passport, driving license, etc.) or non-official identity documents (subscription card, etc.).

Indeed, the falsification of identity documents mainly concerns the replacement of the identity photo. While for a long time this replacement could be quite straightforward, it has become more complex in recent years with the use of "morphed" images.

"Morphed" image is understood to mean the image resulting from a morphological transformation or morphing between the original photograph of the legitimate holder of the identity document and that of a fraudster who wishes to use this identity document.

For a fraudster, the identity document undergoing manipulation is, for example, chosen so that the legitimate holder shares a certain number of morphological traits with the fraudster. This morphological resemblance between the legitimate holder and the fraudster facilitates the work of the forger who prints this morphing onto the identity document (leaving the other security elements intact), which makes it possible to deceive a visual and sometimes even automatic check, while remaining visually compatible with the other security elements of the identity document that echo the photograph, such as, for example, a ghost image, an image with pierced holes, etc.

The objective of the present invention is therefore aimed at ensuring that the illustration, in this case the photograph on the identity document, is the original, i.e. it has not been manipulated in one way or another. It is therefore a matter of authenticating the illustration, as it had to be on the day the identity document was produced, and not authenticating the holder of the document or the subject of the photograph. Accordingly, the present invention deals with photometry and not biometrics.

It obviously applies both to the field of security and to the field of art.

In the field of security, document US2015/0332136 is known, which is aimed at securing an identity photograph by surrounding this with a 2D barcode, the 2D barcode being based on alphanumeric data.

The present invention is aimed at providing an alternative and more secure solution.

SUMMARY OF THE INVENTION

More specifically, the invention relates, according to a first of its objects, to a method for authenticating an illustration, comprising steps consisting in:
encoding a message in the form of a two-dimensional barcode comprising a set of blocks, each block coding a fragment of said message and comprising a set of (M) rows and (N) columns, and each block comprising a set of coding subblocks, each subblock comprising a set of bits.

It is essentially characterized in that the encoding step comprises preliminary steps consisting in:
defining or identifying a set of distinctive points in the illustration,
calculating a set of attributes according to at least some of the distinctive points of said set,
selecting, from among the set of calculated attributes, a set of at least one attribute making it possible to define a digital fingerprint,
optionally compressing said digital fingerprint,
optionally signing said digital fingerprint by means of a cryptographic signature, and
recording in the message one from among:
a set of at least one attribute,
the digital fingerprint,
the compressed digital fingerprint,
the uncompressed signed digital fingerprint, and
the compressed and signed digital fingerprint.

In one embodiment, each coding block further comprises a set of non-coding subblocks the position of which is predefined, the method further comprising, for each coding block, steps consisting in:
selecting a predefined set of coding subblocks,
encoding on a set of at least one predefined non-coding subblock the result of applying an error correcting code to the values encoded by said predefined set of coding subblocks.

Preferably, a step is provided consisting in making the two-dimensional barcode integral with the illustration.

A step may be provided consisting in arranging the 2D barcode in a predefined way with respect to the illustration, optionally by framing the illustration. Thanks to this feature, it is possible, as described subsequently, to simultaneously scan, e.g. with a mobile phone, all the information useful for verification.

It may be provided that the step of selecting a set of at least one attribute making it possible to define a digital fingerprint comprises a step consisting in selecting a number of attributes greater than a threshold value recorded in a memory.

A step may be provided consisting in adding to the digital fingerprint data extrinsic to the illustration. In particular it may be provided that the illustration is a photograph of a document holder, the method comprising a step consisting in adding to the digital fingerprint data extrinsic to the illustration, said extrinsic data comprising at least one of the datasets from among:
data relating to the holder of said document and inscribed in said document,
data relating to said document,
metadata of the document, comprising:
a classification, data originating from external databases, or conditions of use; or a 2D or 3D payload of the holder of the document; or else the date of creation of the illustration or of creation of the two-dimensional barcode.

At least one of the steps may be provided consisting in, for each block:

arranging the coding subblocks and non-coding subblocks so that:
- at least one row of the block comprises a set of two by two adjacent coding subblocks, said set being surrounded by a set of non-coding subblocks, and
- at least one column of the block comprises a set of two by two adjacent coding subblocks, said set being surrounded by a set of non-coding subblocks; and arranging the coding subblocks and non-coding subblocks so that:
- for at least one column comprising a set of coding subblocks, each non-coding subblock of said column encodes a respective result of applying a respective error correcting code to the values encoded by said set of coding subblocks of said column,
- for at least one row comprising a set of coding subblocks, each non-coding subblock of said row encodes a respective result of applying a respective error correcting code to the values encoded by said set of coding subblocks of said row.

Steps may further be provided consisting in:
scrambling the illustration with the aid of an encryption algorithm, and
integrating the decryption key of the scrambled illustration into the two-dimensional barcode.

This is particularly useful, for example, for an illustration of the identity photograph type. Preferably, the illustration is scrambled after a set of distinctive points has been defined or identified and before the scrambled illustration is attached onto its destination medium.

According to another of its objects, the invention relates to a method for authenticating an illustration, comprising a step consisting in:

taking a picture of the illustration and the two-dimensional barcode according to the invention, with an optical sensor.

Steps may be provided consisting in:
decoding the message of said two-dimensional barcode,
in the illustration read by the optical sensor:
defining or identifying a set of distinctive points in the illustration read by the optical sensor,
recalculating a set of attributes according to at least some of the distinctive points of said set,
selecting, from among the set of recalculated attributes, a set of at least one attribute making it possible to define a digital fingerprint,
comparing the value of the difference between the decoded attributes of said two-dimensional barcode and the recalculated attributes to a predetermined threshold value recorded in a memory, and optionally verifying the cryptographic signature.

It may be provided that the illustration and the 2D barcode are:
integral with each other, the method comprising a step consisting in simultaneously displaying the illustration and the two-dimensional barcode or simultaneously transmitting the illustration and the two-dimensional barcode by the same communication means,
not integral with each other, the method comprising a step consisting in:
transmitting the illustration and the two-dimensional barcode by a respective communication means, optionally simultaneously,
transmitting the illustration and the two-dimensional barcode by the same means of communication delayed in time.

Finally, according to another of its objects, the invention relates to a computer program comprising program code instructions for executing the steps of the method according to the invention, when said program is executed on a computer.

Other features and advantages of the present invention will appear more clearly on reading the following description given by way of an illustrative and non-restrictive example and referring to the appended figures.

DETAILED DESCRIPTION

Figure 1:
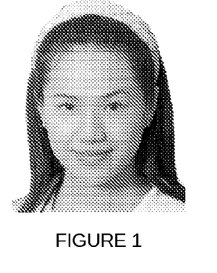
FIG. 1 illustrates an illustration within the meaning of the present invention, in this case an identity photograph.

An illustration is represented in FIG. 1. In this case, the illustration is an identity photograph, in particular intended for an identity document.

A step is first of all provided consisting in digitizing the illustration if it is not already in digital form. For simplicity, hereinafter the illustration or its corresponding digital file are understood to be interchangeable.

In order to be able to subsequently authenticate the illustration and verify its integrity, i.e. that it is not falsified, an encoding mechanism is provided described below.

Distinctive Points

A step is provided consisting in defining, or identifying, a set of distinctive points in the illustration.

A distinctive point is defined as a point in the illustration, i.e. a pixel or a set of two by two adjacent pixels, for which the contrast gradient, in one direction and at a predefined distance, is greater than a predefined threshold value.

For example, a distinctive point is a printing point of an alphanumeric or kanji character. A distinctive point may also be purely graphical, i.e. non-alphanumeric, such as, for example, a point of the iris of an eye.

For a photograph of a person, distinctive points may be, for example, normal biometric elements such as the eyes, the nose, the corner of the lips or the center of the mouth, etc.

More generally, distinctive points may be graphical elements located in an environment with particular physical or mathematical characteristics (in image processing), such as, for example, graphical elements around which a steep gradient is formed, or which meet image processing criteria such as Stephen-Harris detectors. "Steep" gradient is understood to mean a gradient the value of which exceeds a threshold value.

Attributes

From the set of distinctive points, a step is provided consisting in calculating a set of attributes which contribute to the identifiable, or even unique, character thereof. Attributes comprise a set of metrics, i.e. a set of distances or angles between certain distinctive points.

Attributes comprise, for example, the coordinates of distinctive points (with respect to a predetermined reference frame), the distances between certain distinctive points, contrast gradient values around the distinctive points, etc.

The position of the illustration in its representation context (e.g. in the frame depicted in FIG. 2), whether this position is random or imposed, may also be an attribute.

For a photograph of a person, attributes may be, for example, normal biometric elements such as distance ratios between the positions of the eyes, the nose, the corner of the lips or the center of the mouth, or angles between these same elements, etc.

Attributes may be calculated thanks to standard biometric software for portrait illustrations.

For example, for an illustration representing a portrait, the attributes may be calculated based on the morphology of the face (position of the eyes, the nose and the mouth) and on the orientation of the head at the time of taking the picture (head straight, slightly tilted to the left, slightly tilted to the right, etc.).

The SIFT ("Scale-Invariant Feature Transform") algorithm, or the SURF ("Speeded Up Robust Features") algorithm may also be used, both of which are local descriptors which consist, initially, in detecting a certain number of distinctive points in the image, for subsequently calculating a descriptor locally describing the image around each distinctive point. The quality of the descriptor is measured by its robustness to possible changes that an image may undergo, e.g. a change of scale and a rotation.

With regard to the SIFT algorithm, notably described in the publication by D. Lowe. Object recognition from local scale-invariant features. IEEE International Conference on Computer Vision, pages 1150-1157, 1999, detecting points is based on the differences of Gaussians (DoG) obtained by calculating the difference between each pair of images smoothed by a Gaussian filter, by varying the sigma parameter (i.e. the standard deviation) of the filter each time. The DoG may be calculated for different scale levels making it possible to introduce the concept of scale space. Potential areas of points of interest/distinctive points are detected by searching for the extrema along the plane of the dimension of the image (x,y) and the plane of the scale factor. Then a filtering step is needed for removing non-relevant points, by eliminating, for example, the points whereof the contrast is too low.

The SIFT descriptor is calculated on an area around each point of interest, e.g. of 16×16 pixels, subdivided into 4×4 areas of 4×4 pixels. A histogram of the orientations of the gradient based on 8 intervals is then calculated on each of the 16 areas. The concatenation of the 16 histograms gives a descriptor vector of 128 values.

With regard to the SURF algorithm, notably described in the publication by H. Bay, T. Tuylelaars, and L. Van Gool. Surf: Speeded up robust features. European Conference on Computer Vision, pages 404-417, 2006, the method consists in using the determinant of the Hessian matrix to calculate an approximation of the second derivatives of the Gaussians of the image via filters at different scales by using masks of different sizes (e.g. 9×9, 15×15, 21×21, etc.). For calculating the orientation of the points and the descriptors around the points, the principle is based on the sums of the responses of the horizontal and vertical Haar wavelets and their norms. The circular description area is again divided into 16 regions. A wavelet analysis is performed on each region in order to construct the final descriptor. The latter consists of the sum of the gradients in x and y and the sum of their respective norm for the set of 16 regions. The descriptor vector thus consists of 64 values which represent properties extracted both in normal space and in that of the scales of magnitude.

Preferably, a step is provided consisting in classifying the attributes according to an order of priority of probability, which makes it possible to select only the most effective for detecting a possible manipulation of the illustration.

For example, the distance between both eyes of an adult human being is on average 63 mm, and generally between 58 mm and 72 mm. For an illustration representing a portrait, if an attribute calculates that the distance between the two eyes is greater than a predetermined value, in this case 8 cm, or less than another predetermined value, in this case 5 cm, it may be provided that this attribute is rejected (not selected).

A step may therefore be provided consisting in selecting all or part of the calculated attributes. The set of selected attributes defines a digital fingerprint of the illustration.

Preferably, provision is made to select a number of attributes greater than a threshold value recorded in a memory. The more metrics there are and the more different they are from each other, the less confusion there will be.

Fingerprint

Once the attributes have been selected, said digital fingerprint may then be recorded in a memory. In this case, the digital fingerprint is recorded in the form of a data vector in a temporary memory. Typically, the data vector comprises the values of the selected attributes, juxtaposed two by two.

A step may also be provided consisting in adding to the digital fingerprint data extrinsic to the illustration, in particular data intrinsic to the environment with which the illustration is integral.

For example, for an illustration such as a photograph in an environment such as a document, in particular an identity document, at least one of the datasets may be provided from among:
  data relating to the holder of said document and inscribed in said document, e.g. the surname, first name, height, date of birth of the holder, etc.; and which may facilitate checking the document,
  data relating to said document, e.g. information useful to the use of said document (validity date, scope of use, etc.) preferably the authenticity of which is proved by the cryptographic signature described later,
  metadata of the document, for example:
    a classification, data originating from external databases, conditions of use, etc.;
    a "payload" such as a digital fingerprint, the iris scan of an eye, etc. of the holder of the document, represented in the form of a minutiae code; or else
  the date of creation of the illustration or of creation of the 2D barcode described below.

In particular, it may be provided that the payload is one or more 3D identification elements, and not limited to 2D. In this case a set of at least one 3D metric is provided.

Accordingly, provision is made:
  to previously take a 3D photograph of the holder,
  to extract biometric data or specific 3D metrics of said holder,
  to include the specific metric(s) in the 2D barcode, preferably so as to be compatible with a subsequent 2D or 3D facial recognition.

The 3D identification elements may be supplementary to the 2D elements or replace them according to circumstances.

The biometric data or specific 3D metrics of the holder are typically distances between two 3D distinctive points, e.g. the distance between a point of one ear and a point of the eyes, nose or mouth, etc. While such distances may vary with a 2D photograph according to the objective used, this distance is invariant in 3D.

By convention, the term "fingerprint" refers indiscriminately to the set of selected attributes and the set of selected attributes to which are added the data extrinsic to the illustration.

Compression

The digital fingerprint is then preferably compressed to only represent a few bytes of information.

Signature

The optionally compressed digital fingerprint is then signed by means of a cryptographic signature which makes it possible to prove that all this information has been issued by a trusted source.

Advantageously, provision is made to sign by means of a public key cryptographic signature, in particular a compact one, preferably using cryptography on elliptic curves, e.g. according to the Elliptic Curve Digital Signature Algorithm, ECDSA.

This signature exploits the asymmetry between the private key and the public key and makes it possible to securely sign the digital fingerprint, while ensuring:
  first, that no one having the certificate is able to reproduce said signature of the digital fingerprint (and thus be able to cause it to be believed that the content is derived from a trusted source when it is not); and
  secondly, that anyone may verify the authenticity of the digital fingerprint and the identity of its signatory, by means of a safe key provided, for example, in an application on a communicating object (telephone, smartphone, tablet, laptop, etc.) fitted with an optical objective, or in ad hoc software.

2D barcode

A step is provided consisting in encoding a message in the form of a two-dimensional barcode, or "2D barcode", represented by pixels.

The message comprises one from among:
  a set of at least one attribute,
  the digital fingerprint,
  the compressed digital fingerprint,
  the uncompressed signed digital fingerprint, and
  the signed compressed digital fingerprint.

It may also be provided that the message further comprises:
  a set of at least one distinctive point from which the attributes are calculated, which typically makes it possible to only calculate the fingerprint on only a portion of an illustration.

The 2D barcode is then made integral with the illustration, e.g. by printing on the medium of the illustration, and in particular on a page of an identity document. The 2D barcode may also be printed in the form of a label glued to the medium of the illustration. Other techniques may be implemented, e.g. by engraving or otherwise, as long as the 2D barcode can be recognized optically.

It is provided that the 2D barcode is arranged in a predefined way with respect to the illustration, i.e. its shape is predefined, its dimensions are predefined and the relative position between the 2D barcode and the illustration is also predefined.

In the field of art, if the illustration is a painting, it may be provided that the 2D barcode is printed on the medium of the painting, e.g. a canvas, and preferably hidden by the frame thereof; if the illustration is a sculpture, it may be provided that the 2D barcode is printed or engraved on the base thereof.

Figure 2:
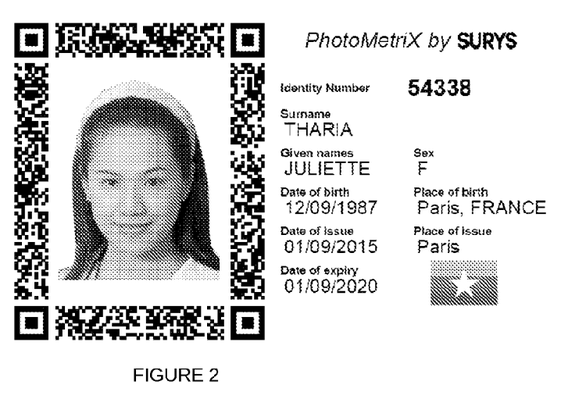
FIG. 2 illustrates an embodiment of a 2D barcode within the meaning of the present invention, surrounding the illustration in FIG. 1, and comprising extrinsic data within the meaning of the present invention.

It may be provided that the 2D barcode frames the illustration, in this case with a polygonal frame, and more particularly with a rectangular frame, as illustrated in FIG. 2, which is advantageous in the field of security.

Preferably, the relative position of the illustration and of the 2D barcode framing it comprises a randomness of position and this relative position is an attribute, which makes it possible to further secure the digital fingerprint. Indeed, two identical illustrations (or the same illustration) generate a first and a second identical 2D barcode. But thanks to the randomness of position, the relative position of the first 2D barcode and the relative position of the second 2D barcode is different. In particular, the randomness of position is a predetermined randomness and not a mechanical randomness due, for example, to manufacture.

Thus, in the field of security, it may happen that an identity document is lost and that the holder of said lost document has a new identity document made with the same photograph as that used for the lost identity document. In this case, as the position of the photograph on the new identity document is not exactly at the same position as on the lost identity document, then the corresponding attribute of the new document is different from the corresponding attribute of the lost identity document. It is thus possible to distinguish between two versions (otherwise identical) of the same document.

Typically, the 2D barcode is constructed within a set of guide markers. These guide markers make it possible to rectify both the illustration and the 2D barcode via image processing. The number of guide markers may be adapted as a function of the target surface on which the illustration is affixed/printed/inscribed/glued etc. Indeed, the target surface may be flat but also cylindrical, conical, truncated cone shaped, etc. The elements to be rectified are included inside in order to ensure their optimal rectification.

For a flat target surface, as illustrated in FIG. 2, three or four guide markers are preferably provided surrounding the illustration to be secured.

Encoding makes it possible to inscribe, in the immediate proximity of the illustration and in a coded manner, security elements that will ensure easy verification by means of any communicating object or camera (including a webcam).

The immediate proximity of the illustration and the 2D barcode ensures some security in that any alteration (intentional or not) of the illustration risks damaging the 2D barcode and vice versa. Moreover, it enables the illustration and the 2D barcode to be simultaneously read by an optical sensor.

Encoding Redundancy

The 2D barcode includes a certain number of redundancy properties of the message for avoiding difficulties in later reading. One possible implementation is the use of a correcting code, typically one of the codes from among:

a Hamming Code a Golay Code a Reed-Muller Code a Goppa Code a Xing Code, and a Reed-Solomon Code.

One example of a method of encoding the 2D barcode consists in creating a plurality of blocks of M rows×N columns of bits each, with M and N both natural integers greater than or equal to 3.

Preferably M=N so as to obtain square blocks.

Depending on the length of the message, said message may be split into fragments, each fragment being encoded on a respective block. For brevity, message and fragment(s) will be considered alike.

The blocks may be distributed in various forms adapted to the medium used. For example, the blocks may be distributed in the background of a photograph or form a particular pattern. The only constraint is that they remain within the area covered by the guide markers or in their immediate proximity, in order to allow them to be correctly rectified.

In a coding block, a fragment is encoded over a set of "coding" bits the position of which is known and predetermined.

It is provided here that each coding block contains, in addition to the coding bits, a set of non-coding bits, different from the coding bits, and the position of which is also known and predetermined.

In this case, it is provided that each M×N block is organized into:

a set of coding subblocks, each coding subblock comprising a set of Mc×Nc coding bits; with Mc and Nc two natural integers such that Mc<M and Nc<N, in particular Mc=M/2 and Nc=N/2, and a set of non-coding subblocks, each non-coding subblock comprising a set of Mn×Nn non-coding bits; with Mn and Nn two natural integers such that Mn<M and Nn<N, in particular Mn=M/2 and Nn=N/2.

According to the invention, each block therefore contains a set of subblocks of coding bits, and a set of subblocks of non-coding bits, the position of each subblock being known and predetermined.

Preferably, if M=N, it is then provided that Mc=Nc and Mn=Mn so as to also obtain square subblocks.

Preferably, Mc=Mn and Nc=Nn, so that the coding subblocks have the same size as the non-coding subblocks.

Figure 4:
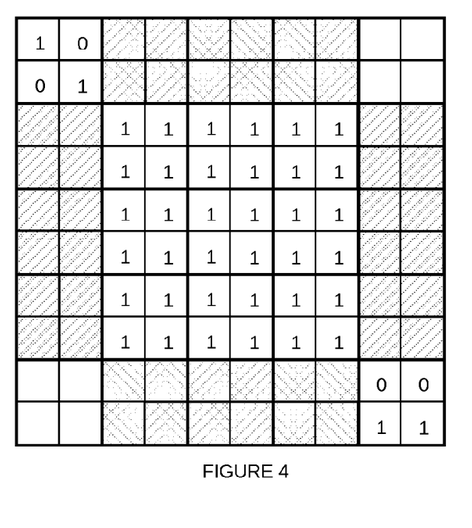
FIG. 4 illustrates an embodiment of a block within the meaning of the present invention.

For example, as illustrated in FIG. 4, Mc=Nc=Mn=Nn=2. Each block is therefore organized into subblocks of 2×2 coding or non-coding bits each, illustrated in bold lines in FIG. 4, and each encoding 4 bits or $2^4=16$ values.

It is provided that at least one portion of the non-coding subblocks of a given block implements an error correcting code, in this case a Reed-Solomon code, on the data encoded by at least one portion of the coding subblocks.

It may be provided that:

At least one of the non-coding subblocks is a synchronization subblock serving to resynchronize the block by means of a guide marker, e.g. a conventional code such as (1, 0, 0, 1) as illustrated in FIG. 4 for the subblock positioned at the top left of the block, At least two of the non-coding subblocks are security subblocks preferably arranged diametrically opposite, which makes it possible to secure a central diagonal of the block by means of an error correcting code, in this case a Reed-Solomon code and, for example, a Reed-Solomon Code RS(5,3) for a 5×5 block, which is illustrated by blank subblocks at the bottom left and top right of the 10×10 block in FIG. 4, At least one of the non-coding subblocks is a numbering subblock making it possible to number the block (numbering from 0 to 15 in this case), which is useful in case of non-linear organization, and which is illustrated by the subblock (0, 0, 1, 1) at the bottom right of the block in FIG. 4.

The numbering subblock may be replaced by a security subblock or other subblock.

Preferably, the synchronization subblock, the security subblocks and the optional numbering subblock are arranged at the 4 corners of the block, as illustrated in FIG. 4.

Preferably, it is provided for a block that:

at least one row of the block comprises a set of two by two adjacent coding bits (respectively a set of subblocks), said set being surrounded by a set of non-coding bits (respectively a set of subblocks), and at least one column of the block comprises a set of two by two adjacent coding bits (respectively a set of subblocks), said set being surrounded by a set of non-coding bits (respectively a set of subblocks).

In particular, it may be provided that the set of non-coding subblocks of a given row implements an error correcting code for the data coded by the set of coding subblocks of said row.

Similarly, it may be provided that the set of non-coding subblocks of a given column implements an error correcting code for the data coded by the set of coding subblocks of said column.

Thus, each row and each column of each block enjoy a redundancy through an error correcting algorithm, e.g. a Reed-Solomon code.

In one embodiment, the coding subblocks are arranged at the center of the block and surrounded by the non-coding subblocks.

Thanks to this feature, each block comprises a correcting code in two simultaneous perpendicular directions, which makes it possible to limit the risk of scratches, most often linear, preventing the reading of a portion of the 2D barcode information.

In particular, it may be provided that each non-coding subblock of a given row implements a Reed-Solomon code RS(X,Y) of the coding subblocks of said row, with:

X the total number of subblocks (coding and non-coding) of said row, and

Y the number of non-coding subblocks of said row.

In this case, with a 10×10 block comprising 5 2×2 subblocks distributed in 3 coding subblocks and 2 non-coding subblocks, X=M/2, i.e. M=10; X=5 and Y=X−2=3. In this example illustrated in FIG. 4, there is therefore at least one row comprising 3 coding subblocks flanked by 2 non-coding subblocks each implementing a Reed-Solomon code RS(5,3).

Similarly, it may be provided that each non-coding subblock of a given column implements a Reed-Solomon code RS(X',Y') of the coding subblocks of said row, with X' the total number of subblocks (coding and non-coding) of said column, and Y' the number of non-coding subblocks of said row.

In this case, with a 10×10 block comprising 5 2×2 subblocks distributed in 3 coding subblocks and 2 non-coding subblocks, X'=M/2, i.e. M=10, X'=5 and Y'=X'−2=3. In this example illustrated in FIG. 4, there is therefore at least one column comprising 3 coding subblocks flanked by 2 non-coding subblocks each implementing a Reed-Solomon code RS(5,3).

In this case, each block therefore comprises 5×5 subblocks, distributed in 3×3 central coding subblocks and in 16 peripheral non-coding subblocks. It is provided that the 3×3 central subblocks contain the message, represented by the set of values 1 in FIG. 4. The subblocks of the first row, of the last row, of the first column and of the last column of the block constitute the peripheral non-coding subblocks. Four peripheral subblocks constitute the corners of the block. The other subblocks constitute the central coding subblocks.

Once the 2D barcode has been encoded, it is made integral with the illustration, e.g. by printing on the same medium as the latter.

In particular, it may be provided, for greater discretion and depending on the type of use, that the code is printed with an invisible ink, typically comprising UV or IR pigments, which allows it not to be visible, thus not to interfere with reading/viewing the illustration in visible light, and still be able to be checked by checking under UV or IR lighting.

Decoding

Provision is made to perform an optical capture of the illustration and the 2D barcode, thanks to an optical objective, preferably simultaneously.

For example, the optical objective is that of a communicating object, the communicating object also comprising a memory. Alternatively, the optical objective may be a camera or a webcam connected to a computer and a memory.

A computer program for decoding described below is recorded in the memory.

A step is provided consisting in searching for the position of the guide markers, e.g. by the use of gradient detectors.

Once the guide markers have been identified, a step is provided consisting in rectifying the image included between the guide markers, e.g. by means of the Warp-Affine method in the OpenCV library.

Rectifying consists in reconstructing, despite a shooting angle that is sometimes non-orthogonal to the plane of the illustration, the set of the components of the 2D barcode as they would be found on a flat initial surface.

Then a step is provided consisting in matching the rectified image with a predetermined grid, which allows the reading of the pixels of the 2D barcode and the conversion thereof into a string of binary symbols.

The message may then be decoded, by passing these symbols to the inverse algorithm of the algorithm used for encoding.

The signature is then verified to ensure that it is indeed an authentic content issued by the signatory authority. If this is not the case, the message may be rejected as non-authentic.

If the authenticity is verified, the features of the illustration, the data (attributes) and the metadata are extracted from the 2D barcode. These attributes extracted from the 2D barcode are then said to be "read".

In parallel (or in series) with the preceding operations, the illustration read by the optical sensor is processed to extract therefrom the same distinctive points and the same selected attributes as during the generation of the 2D barcode. These attributes extracted from the digital image of the illustration are then said to be "recalculated". In particular, all or part of the initially recorded distinctive points may be considered, depending on the desired confidence level.

Then a step is provided consisting in comparing the value of the difference between the read attributes and the recalculated attributes to a predetermined threshold value recorded in a memory.

Typically the difference between read attributes and the recalculated attributes is obtained by means of a set of metrics (typically ratios of distance or angles), e.g. Euclidean.

Figure 3:
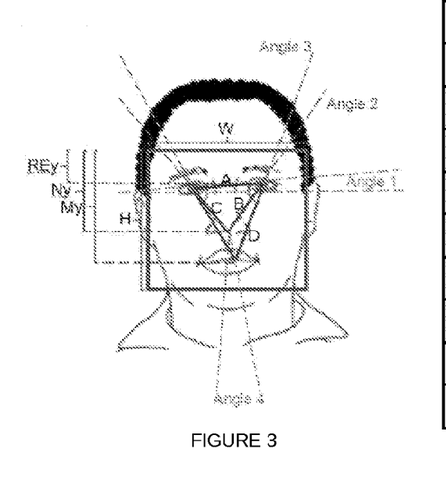
FIG. 3 illustrates metric attributes within the meaning of the present invention.

For example, as illustrated in FIG. 3, it is provided that:
a metric REy corresponds to the distance between the two pupils,
a metric Ny corresponds to the distance between the two nostrils,
a metric My corresponds to the distance between the two corners of the lips,
a metric Angle2 corresponds to the angle between the pupils and the tip of the nose,
etc.

If the distance between the read attributes and the recalculated attributes is below the threshold value, it is considered that the illustration read by the optical sensor is actually the original illustration, otherwise the read illustration is considered as not being authentic.

Advantageously, this comparison may be implemented offline. It is therefore possible to verify the authenticity of an illustration anywhere, thanks to a communicating object and without a network connection.

In the event that the digital fingerprint further comprises data extrinsic to the illustration, said extrinsic data (e.g. card number, surname, first name, etc.) decoded from the 2D barcode may then be further displayed to a user on a display screen, and enable them to verify for themselves that it is indeed the information present on the document.

The metadata may also be used to check the features specific to the holder of the document, thanks to additional technical means (e.g. a fingerprint reader, an iris scanner, etc.). The illustration (the photograph) thus authenticated may allow a biometric verification of the holder.

Advantageously, the message is extracted automatically.

The present invention makes it possible to authenticate the same illustration at two distinct times, despite the inevitable damage in the life cycle thereof or of a document supporting it.

The present invention may also make it possible to authenticate that the copy of an illustration is consistent with the original.

The present invention is not limited to the previously described embodiments. For example, it may be implemented in the field of authenticating registered trademarks, e.g. for authenticating that the trademark affixed to a product is actually the original trademark; for authenticating labels, in particular comprising a randomness of manufacture making it possible to characterize them, notably in the field of security or wines and spirits.

Accordingly, an illustration within the meaning of the present invention may be a graphic signature within the meaning of patent EP2526531 filed by the applicant.

The invention claimed is:

1. A method for authenticating an illustration, said method comprising:
   using an optical sensor, taking a picture of the illustration and a two-dimensional barcode,
   wherein encoding a message in the form of a two-dimensional barcode, said barcode comprising a set of blocks, each of which codes a fragment of said message, wherein each block comprises rows, columns, and a set of coding subblocks, wherein each subblock comprises bits comprised:
   defining or identifying a set of distinctive points in the illustration, wherein each of said distinctive points is selected from the group consisting a pixel and a set of two-by-two adjacent pixels, wherein each distinctive point has a contrast gradient that, in one direction and at a predefined distance from said distinctive point, exceeds a predefined threshold value, calculating a set of attributes according to at least some of the distinctive points of said set, selecting, from among the attributes thus calculated, an attribute that makes it possible to define a digital fingerprint, and recording, in the message, one from among: the set of attributes and the digital fingerprint, wherein the digital fingerprint is one of unsigned and uncompressed, unsigned and compressed, signed and uncompressed, and signed and compressed, decoding the message of said two-dimensional barcode, in the picture taken by the optical sensor:
defining or identifying a set of distinctive points in the illustration,
recalculating a set of attributes according to at least some of the distinctive points of said set, and
selecting, from among the set of recalculated attributes, a set of at least one attribute making it possible to define a digital fingerprint, and comparing the value of the difference between the decoded attributes of said two-dimensional barcode and the recalculated attributes to a predetermined threshold value recorded in a memory.

2. The method as claimed in claim 1, wherein each of said blocks further comprises a set of non-coding subblocks at a predefined position, wherein the method further comprises, for each coding block, selecting a predefined set of coding subblocks and encoding, on a set of at least one predefined non-coding subblock, a result of having applied an error correcting code to the values encoded by said predefined set of coding subblocks.

3. The method as claimed in claim 2, further comprising, for each block:
arranging the coding subblocks and non-coding subblocks so that: at least one row of the block comprises a set of two-by-two adjacent coding subblocks, said set being surrounded by a set of non-coding subblocks and at least one column of the block comprises a set of two-by-two adjacent coding subblocks, said set being surrounded by a set of non-coding subblocks and
arranging the coding subblocks and non-coding subblocks so that: for at least one column comprising a set of coding subblocks, each non-coding subblock of said column encodes a respective result of having applied a respective error correcting code to the values encoded by said set of coding subblocks of said column and for at least one row comprising a set of coding subblocks, each non-coding subblock of said row encodes a respective result of having applied a respective error correcting code to the values encoded by said set of coding subblocks of said row.

4. The method as claimed in claim 1, further comprising making the two-dimensional barcode integral with the illustration.

5. The method as claimed in claim 4, further comprising arranging the 2D barcode in a predefined way with respect to the illustration.

6. The method as claimed in claim 5, wherein arranging the 2D barcode comprises framing the illustration.

7. The method as claimed in claim 1, further comprising selecting a number of attributes to be greater than a threshold value, wherein said threshold value is recorded in a memory.

8. The method as claimed in claim 1, wherein the illustration is a photograph of a document holder, wherein the method further comprises adding, to the digital fingerprint, data that is extrinsic to the illustration, said extrinsic data comprising at least one datasets from among:
data relating to the holder of said document and inscribed in said document,
data relating to said document, and
metadata of the document, wherein said metadata comprises one of
a classification,
data originating from external databases or conditions of use,
a 2D or 3D payload of the holder of the document; and
the date of creation of the illustration or of creation of the two-dimensional barcode.

9. The method as claimed in claim 1, further comprising:
scrambling the illustration with the aid of an encryption algorithm and integrating the decryption key of the scrambled illustration into the two-dimensional barcode.

10. The method as claimed in claim 9, wherein the illustration and the 2D barcode are not integral with each other, wherein the method further comprises transmitting the illustration and the two-dimensional barcode by a respective communication means.

11. The method of claim 10, wherein the illustration and the 2D barcode are not integral with each other, wherein the method further comprises transmitting the illustration and the two-dimensional barcode by the communication means but at different times.

12. The method of claim 1, further comprising verifying the cryptographic signature.

13. A method for authenticating an illustration, said method comprising:
encoding a message in the form of a two-dimensional barcode, said barcode comprising a set of blocks, each of which codes a fragment of said message, wherein each block comprises rows, columns, and a set of coding subblocks, wherein each subblock comprises bits, wherein encoding said message comprises:
defining or identifying a set of distinctive points in the illustration, wherein each of said distinctive points is selected from the group consisting a pixel and a set of two-by-two adjacent pixels, wherein each distinctive point has a contrast gradient that, in one direction and at a predefined distance from said distinctive point, exceeds a predefined threshold value,
calculating a set of attributes according to at least some of the distinctive points of said set,
selecting, from among the attributes thus calculated, an attribute that makes it possible to define a digital fingerprint,
recording, in the message, one from among: the set of attributes and the digital fingerprint, wherein the digital fingerprint is one of unsigned and uncompressed, unsigned and compressed, signed and uncompressed, and signed and compressed,
the method further comprising:
scrambling the illustration with the aid of an encryption algorithm and integrating the decryption key of the scrambled illustration into the two-dimensional barcode, wherein the illustration and the 2D barcode are integral with each other and wherein the method further comprises simultaneously displaying the illustration and the two-dimensional barcode or simultaneously transmitting the illustration and the two-dimensional barcode by the same communication means.

14. A non-transitory computer-readable medium having encoded thereon a computer program comprising program code instructions for executing the steps of the method as claimed in claim 1 when said program is executed on a computer.

\* \* \* \* \*